US011632918B2

(12) United States Patent
Charling et al.

(10) Patent No.: US 11,632,918 B2
(45) Date of Patent: Apr. 25, 2023

(54) SYSTEM AND METHOD FOR DETECTING PONDING IN IRRIGATED FIELDS

(71) Applicant: LINDSAY CORPORATION, Omaha, NE (US)

(72) Inventors: Kurtis Arlan Charling, Elkhorn, NE (US); Michael George Ricketts, Feilding (NZ)

(73) Assignee: LINDSAY CORPORATION, Omaha, NE (US)

( * ) Notice: Subject to any disclaimer, the term of this patent is extended or adjusted under 35 U.S.C. 154(b) by 239 days.

(21) Appl. No.: 16/941,837

(22) Filed: Jul. 29, 2020

(65) Prior Publication Data

US 2022/0030784 A1 Feb. 3, 2022

(51) Int. Cl.
*A01G 25/09* (2006.01)
*A01B 79/00* (2006.01)
*A01B 69/04* (2006.01)

(52) U.S. Cl.
CPC .......... *A01G 25/092* (2013.01); *A01B 79/005* (2013.01); *A01B 69/008* (2013.01)

(58) Field of Classification Search
CPC .... A01G 25/092; A01B 79/005; A01B 69/008
USPC .......................................................... 239/11
See application file for complete search history.

(56) References Cited

U.S. PATENT DOCUMENTS

| 5,246,164 | A | * | 9/1993 | McCann | A01G 25/16 239/11 |
| 5,278,749 | A | * | 1/1994 | De Man | A01G 25/16 239/69 |
| 5,337,957 | A | * | 8/1994 | Olson | A01G 25/167 239/69 |
| 5,341,831 | A | * | 8/1994 | Zur | A01G 25/167 239/63 |
| 5,478,013 | A | * | 12/1995 | Ballu | A01M 7/0089 239/71 |
| 5,927,603 | A | | 7/1999 | McNabb | |
| 10,025,983 | B2 | | 7/2018 | Guan et al. | |
| 10,076,089 | B2 | | 9/2018 | Chitnis et al. | |
| 2008/0046130 | A1 | | 2/2008 | Faivre et al. | |
| 2010/0032493 | A1 | | 2/2010 | Abts et al. | |
| 2018/0100606 | A1 | | 4/2018 | Korus | |
| 2019/0133058 | A1 | | 5/2019 | Larue | |
| 2020/0050826 | A1 | | 2/2020 | Guan et al. | |

OTHER PUBLICATIONS

International Search Report and Written Opinion dated Nov. 18, 2021 for PCT/US2021/042462, Filed Jul. 21, 2021 and all references cited therein.

* cited by examiner

*Primary Examiner* — Chee-Chong Lee
(74) *Attorney, Agent, or Firm* — Hovey Williams LLP

(57) ABSTRACT

A ponding monitoring and detection system monitors, detects, and predicts ponding in an irrigated field in essentially real-time. The ponding monitoring and detection system also monitors and records locations of detected and predicted ponding.

22 Claims, 3 Drawing Sheets

SYSTEM AND METHOD FOR DETECTING PONDING IN IRRIGATED FIELDS

BACKGROUND OF THE INVENTION

1. Field of the Invention

The present invention relates to mobile irrigation systems. More particularly, the invention relates to a system and method for monitoring, detecting, and predicting ponding in a field irrigated by a mobile irrigation system.

2. Background

Mobile irrigation systems such as center pivot and lateral move irrigation systems are commonly used to irrigate crops. A center pivot irrigation system includes, among other things, a center pivot connected to a pressurized water supply and a main section that moves about the center pivot to irrigate a circular or semi-circular field. The main section includes a number of mobile support towers connected to the center pivot and to one another by truss-type framework sections. The mobile support towers are supported on wheels and tires that are driven by electric or hydraulic drive trains that each comprise a drive motor and at least one wheel drive gearbox. A water distribution conduit is supported by the mobile support towers and framework sections, and a number of sprinkler heads, spray guns, drop nozzles, or other water emitters are spaced along the length of the conduit for irrigating crops below the irrigation system. Lateral irrigation systems are similar except they don't include center pivots and move in a relatively straight line rather than a circle.

Irrigation systems prevent under-watering of crops, but sometimes the opposite is a problem too. Over-watering, too much precipitation, and/or irrigation rates not properly matched to soil types and conditions can cause standing water or "ponding". Such ponding can damage crops and fields and strip fertilizers and other nutrients from the soils. If such ponding is not detected, continued irrigation further damages the crops and fields and wastes valuable energy and water.

Ponding is typically detected visually by a farmer or other operator while manually inspecting a field. This is time-consuming and often inaccurate. Images from drones, aircraft, and satellites can also be used to detect ponding, but these methods are ineffective once a mature crop creates a canopy over the field. Moreover, both manual inspections and image capture methods only detect ponding after it has occurred and crop and field damage has already been done and are ineffective at predicting future ponding.

Soil moisture data obtained from soil moisture sensors is often used to determine when and how much to irrigate. Although excessive soil moisture is one contributing factor of ponding, soil moisture alone does not always indicate or detect ponding. For example, ponding can occur even on dry soil when the composition of the soil creates a poor water infiltration rate, and ponding often does not occur when irrigating moist soil if the soil's infiltration rate and other factors allow the applied water to properly infiltrate the soil.

SUMMARY

Embodiments of the present invention solve at least some of the above-described problems and related problems by providing a ponding monitoring and detection system that monitors, detects, and predicts ponding in an irrigated field in essentially real-time before the ponding causes crop and field damage so that an operator and/or a control system can take corrective action to minimize the effects of the ponding. The ponding monitoring and detection system also monitors and records locations of detected and predicted ponding so an operator may quickly and easily locate and inspect the portions of a field experiencing ponding or possible future ponding.

The ponding monitoring and detection system may be implemented in any mobile irrigation system. A mobile irrigation system constructed in accordance with an embodiment of the invention may broadly comprise a plurality of spaced-apart and interconnected mobile towers; a fluid distribution conduit supported by the mobile towers and connected to a source of fluids; a plurality of fluid emitters connected to the fluid distribution conduit for applying fluids to fields underneath the irrigation system; a control system for controlling a speed and direction of the mobile towers and application of the fluids by the fluid emitters; and the above-mentioned ponding monitoring and detection system.

At least one of the mobile towers includes a drive train with a drive motor and a wheel drive gearbox for driving the mobile tower. The mobile irrigation system also includes at least one pump and a valve operatively connected to the fluid distribution conduit and the fluid emitters.

The ponding monitoring and detection system broadly comprises at least one ponding sensor; at least one location sensor; a data transmitter; and a processing system. These and other components of the ponding monitoring and detection system may be housed in their own enclosure or enclosures or may be integrated in other control systems and/or electronic enclosures of the irrigation system.

Each ponding sensor senses conditions of a field representative of ponding and generates corresponding sensor data. The ponding sensors are preferably located on the mobile irrigation system, but they may be located on anything that moves with the irrigation system. In one embodiment, at least one ponding sensor is mounted below each mobile tower of the irrigation system.

In some embodiments, the ponding sensors are light detection and ranging (LIDAR) sensors, radio detection and ranging (RADAR) sensors, or other distance measuring sensors that sense distances between the sensors and the field or water accumulated on the field. This sensed distance can be used to detect standing water, because the distance between each sensor and standing water will be less than the distance between the sensor and a surface of the field not covered by water.

In other embodiments, the ponding sensors may be thermal image sensors that sense soil temperatures, with the temperatures being representative of standing water, moist soil, and/or dry soil. In still other embodiments, the ponding sensors may be cameras for capturing images of crops and/or the field in which the crops are planted. The images can be analyzed to detect standing water, moist soil, and or dry soil. The ponding sensors may also comprise one or more soil moisture sensors, rainfall sensors, irrigation rate sensors, and other sensors that detect the amount of water applied to the field either via the irrigation system or rainfall.

Each location sensor senses locations of the mobile irrigation system as it travels across a field and as the ponding sensors monitor the field conditions described above. In some embodiments, the location sensors may be GPS receivers or other global navigation satellite system (GNSS) receivers that track coordinates of portions of the irrigation system on which the ponding sensors are mounted. In other embodiments, the location sensors may include an angle encoder, cam switch, proximity switch, optical encoder, potentiometer, light bar sensor, or other mechanism for determining relative angular positions of the mobile towers with respect to the fixed pivot or another fixed object. In some embodiments, a location sensor is mounted to or near each ponding sensor or groupings of ponding sensors to capture location data for all ponding sensors as they are carried across an irrigated field on the irrigation system.

The processing system may be located on the irrigation system or remotely from the irrigation system and receives the sensor data from the ponding sensors and the location data from the location sensors. The processing system may also receive or otherwise access crop data representative of crop, soil, or water conditions in the field. The crop data may include, for example, soil composition data (amount of sand, clay, etc.) and water infiltration rates for portions or zones of the irrigated field.

The processing system periodically or continuously stores the sensor data and the location data as the irrigation system travels across a field and creates a geo-referenced log of the sensor data for multiple locations in the field. The processing system may also store the date and time the sensor data and location data was obtained so the log provides a historical reference of the ponding conditions of the field over time.

The processing system also analyzes the sensor data and the crop data to detect or predict ponding on the field. To detect ponding, the processing system may compare the sensor data to threshold levels. For example, the processing system may compare the data from the LIDAR sensors, RADAR sensors, or other distance measuring sensors to threshold distance levels to determine if the distances between the ponding sensors and the field or water accumulated on the field is less than the threshold distances, thus indicating standing water on the field. The threshold distances levels may be selected by the operator and may vary from field to field and even for different locations within the same field but are generally related to the height the ponding sensors are mounted above the ground.

In other embodiments, the processing system may detect ponding by comparing the sensor data to historical sensor data. For example, the processing system may compare the data from the LIDAR sensors, RADAR sensors, or other distance measuring sensors to historical distance levels to determine if the current distance between the ponding sensors and the field or water accumulated on the field is less than historical levels for the same geographic coordinates, thus indicating standing water on the field.

The processing system may also approximate the size and/or boundaries of detected ponding by considering which of the ponding sensors detect ponding, the distance between ponding sensors that detect ponding, how long the sensors detect the ponding as the irrigation system moves, and the speed of the irrigation system. Data representative of the ponding size may be stored in memory and accessed for subsequent ponding prediction as described below.

When ponding is detected, the processing system stores data that may be helpful in analyzing the ponding and predicting future ponding. For example, the processing system may store data representative of the location of the detected ponding; data representative of the size and/or boundaries of the ponding; the date and time the ponding was detected; the date and time the ponding is no longer detected; data representative of the amount of time that elapses from when ponding is detected and then is no longer detected; the amount of irrigation applied to the relevant portions of the field for different time periods before the ponding was detected; and the amount of precipitation received by the relevant portions of the field for different time periods before the ponding was detected.

To predict possible future ponding, the processing system may analyze sensor data acquired over time to determine rates of change of field conditions that may be indicative of future ponding. For example, the processing system may determine and analyze rates of change of data from soil moisture sensors, rainfall sensors, irrigation rate sensors, and other sensors that detect the amount of water applied to the field to detect when the applied water may begin to accumulate on the field. The processing system may also analyze the soil data, such as water infiltration rates for specific portions of the field, to help detect when the water may begin to accumulate on the field.

Ponding may also be predicted by comparing the data stored for previously detected ponding to current conditions. For example, via machine learning, the processing system may predict future ponding by accessing the stored data for previously detected ponding and comparing current precipitation and irrigation rates to the historical precipitation and irrigation rates that caused the detected ponding.

When ponding or likely future ponding is detected, the processing system generates a corrective action signal and transmits it to a remote computer, smart phone, or control station so a farmer or other operator may take corrective action. The farmer or other operator may, for example, stop the irrigation system, alter the amount of water delivered by the irrigation system, and/or alter the speed of the irrigation system.

In other embodiments, the processing system may transmit the corrective action signal to an irrigation control system that controls operation of the agricultural irrigation system. The corrective action signal may include instructions for operating the agricultural irrigation to alleviate the ponding or predicted ponding. Such instructions may include, for example, stopping movement of the irrigation system, altering the amount of water delivered by the irrigation system, and/or altering the speed of the irrigation system.

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures. For example, the principles of the present invention are not limited to center pivot irrigation systems but may be implemented in other types of mobile system that develop wheel tracks.

BRIEF DESCRIPTION OF THE DRAWING FIGURES

Embodiments of the present invention are described in detail below with reference to the attached drawing figures, wherein.

DETAILED DESCRIPTION

Embodiments of the present invention provide a mobile irrigation system with a ponding monitoring and detection system that monitors, detects, and predicts ponding in an irrigated field in essentially real-time before the ponding causes crop and field damage so that an operator and/or a control system can take corrective action to minimize the effects of the ponding. The ponding monitoring and detection system also monitors and records locations of detected and predicted ponding so an operator may quickly and easily locate and inspect the portions of a field experiencing ponding or possible future ponding.

Figure 1:
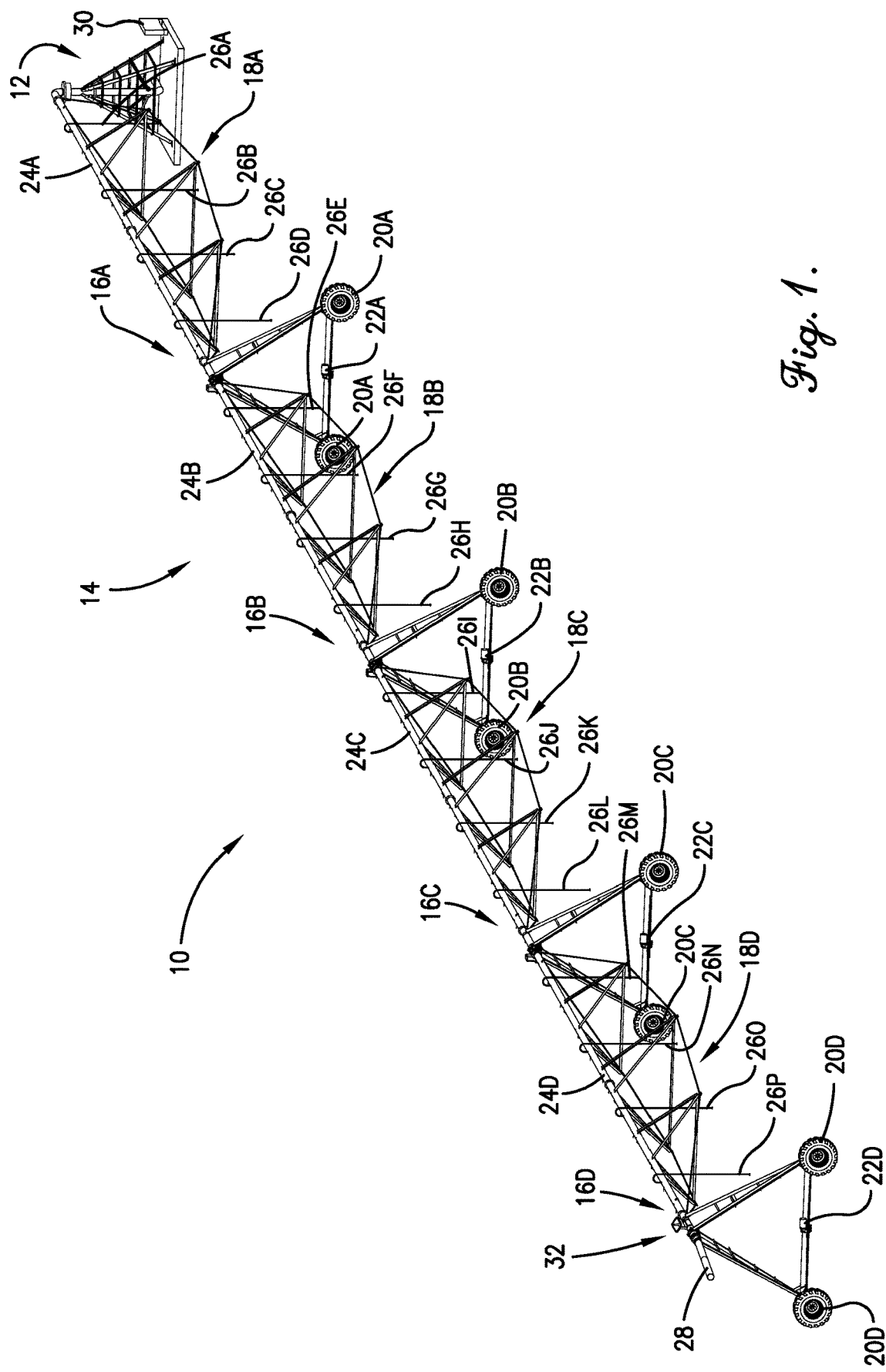
FIG. 1 is a perspective view of an exemplary center pivot irrigation system on which a wheel track monitoring system constructed in accordance with embodiments of the present invention may be used.

An exemplary irrigation system 10 with which the ponding monitoring and detection system may be used is shown in FIG. 1. The illustrated irrigation system 10 is a center pivot irrigation system, but it may also be a linear move or lateral type irrigation system or any other type of automated irrigation system. The illustrated irrigation system 10 broadly comprises a fixed center pivot 12 and a main section 14 pivotally connected to the center pivot.

The fixed center pivot 12 may be a tower or any other support structure about which the main section 14 pivots. The center pivot has access to a well, water tank, or other source of water and may also be coupled with a tank or other source of agricultural products to inject fertilizers, pesticides and/or other chemicals into the water for application during irrigation.

The main section 14 pivots or rotates about the center pivot 12 and includes a number of mobile support towers 16A-D, the outermost 16D of which is referred to herein as an end tower. The mobile towers are connected to the fixed center pivot 12 and to one another by truss sections 18A-D or other supports to form a number of interconnected spans. The illustrated irrigation system 10 has four mobile support towers, and thus four spans, however, it may comprise any number of towers and spans without departing from the scope of the invention.

The mobile towers have wheels 20A-D driven by drive motors 22A-D. Each motor 22A-D turns at least one of the wheels 22A-D through a drive shaft to move its mobile tower and thus the main section 14 in a circle or semi-circle about the center pivot 12. The motors 22A-D may include integral or external relays so they may be turned on, off, and reversed by a control system described below. The motors may also have several speeds or be equipped with variable speed drives.

Although not required, some or all of the towers 16A-D may be equipped with steerable wheels pivoted about upright axes by suitable steering motors so that the towers can follow a predetermined track. As is also well known, the drive motors for the towers are controlled by a suitable safety system such that they may be slowed or completely shut down in the event of the detection of an adverse circumstance.

The mobile towers 16A-D and the truss sections 18A-D carry or otherwise support inter-connected conduit sections 24A-D or other fluid distribution mechanisms that are connected to a source of fluids from the center pivot. A plurality of sprinkler heads, spray guns, drop nozzles, or other water emitters 26A-P are spaced along the conduit sections 24A-D to apply water and/or other fluids to land underneath the irrigation system.

One or more valves may be disposed between the conduit sections 24A-D and the water emitters 26A-P to control the flow of water through the water emitters. In some embodiments, the irrigation system includes several valves, and each valve controls the flow of water through a single water emitter such that each water emitter can be individually opened, closed, pulsed, etc. to emit any amount of water. In other embodiments, the irrigation system 10 includes several valves that each control the flow of water through a group of water emitters such that the group of water emitters is controlled to emit a specific amount of water. For example, each span of the irrigation system may include four water emitters, and one valve may control the water flow through all four water emitters such that all of the water emitters on a span operate in unison. The valves may be magnetic latching solenoid valves that are normally biased to an off/closed state such that the valves only switch to an on/open state when powered, but they may be any type of valve.

The irrigation system 10 may also include a flow meter that measures water flow rates through the system. Outputs from the flow meter may be provided to the control system. In one embodiment, a single flow meter measures flow rates through the entire irrigation system and provides an indication of this aggregate flow rate to the control system. In other embodiments, multiple flow meters provide flow-rate measurements through different portions of the irrigation system, such as through each span of the irrigation system or even each water emitter.

Embodiments of the irrigation system 10 may also include a pressure regulator for regulating the pressure of water through the irrigation system. Pumps that provide water to the irrigation system may be configured to provide a minimum water pressure, and the pressure regulator then reduces the pump water pressure to a selected maximum pressure level such that the pumps and pressure regulator together provide a relatively constant water pressure through the irrigation system.

The irrigation system 10 may also comprise other components such as an extension arm (also commonly referred to as a "swing arm" or "corner arm") pivotally connected to the free end of the main section and/or one or more high pressure sprayers or end guns 28 mounted to the end tower 16D or to the end of the extension arm. The end guns are activated at the corners of a field or other designated area to increase the amount of land that can be irrigated.

The irrigation system 10 may also comprise a control system 30 for controlling operation of the irrigation system. The control system can be located anywhere, such as in a panel beside the center pivot 12 as shown in FIG. 1, and can be implemented with hardware, software, firmware, or a combination thereof. One embodiment of the control system 30 may comprise a processing element, controller, or other computing device; conventional input devices such as knobs, buttons, switches, dials, etc.; inputs for receiving programs and data from external devices; one or more displays; a cellular or other radio transceiver for wirelessly receiving and transmitting data from and to remote devices; a Bluetooth transceiver; a Wi-Fi transceiver; and/or other electronic components.

The control system 30 controls operational aspects of the irrigation system such as the speed and direction of the mobile towers, and hence the speed of the irrigation system, via control signals provided to the relays connected to the motors 22A-D of the mobile towers 11A-D. Likewise, the control system 30 controls the water flow through the water emitters 26A-P via control signals provided to the relays connected to the valves 28A-D. The control system 30 may also control other operational aspects such as a fertilizer application rate, a pesticide application rate, end gun operation, mobile tower direction (forward or reverse), and/or system start-up and/or shut-down procedures.

The control system 30 may control some of the above-described operational aspects of the irrigation system in accordance with an irrigation plan (also sometimes referred to as a "sprinkler chart" or "watering plan"). An irrigation plan specifies how much water to apply to a field, and sometimes to different portions of a field, based on various different criteria such as the types of crops to be irrigated; the soil conditions in various parts of the field; the existence of slopes, valleys, etc. in the field; the existence of roads, buildings, ponds, and boundaries that require no irrigations; crop growth cycles; etc. One or more irrigation plans may be created then stored in memory associated with the control system.

Figure 2:
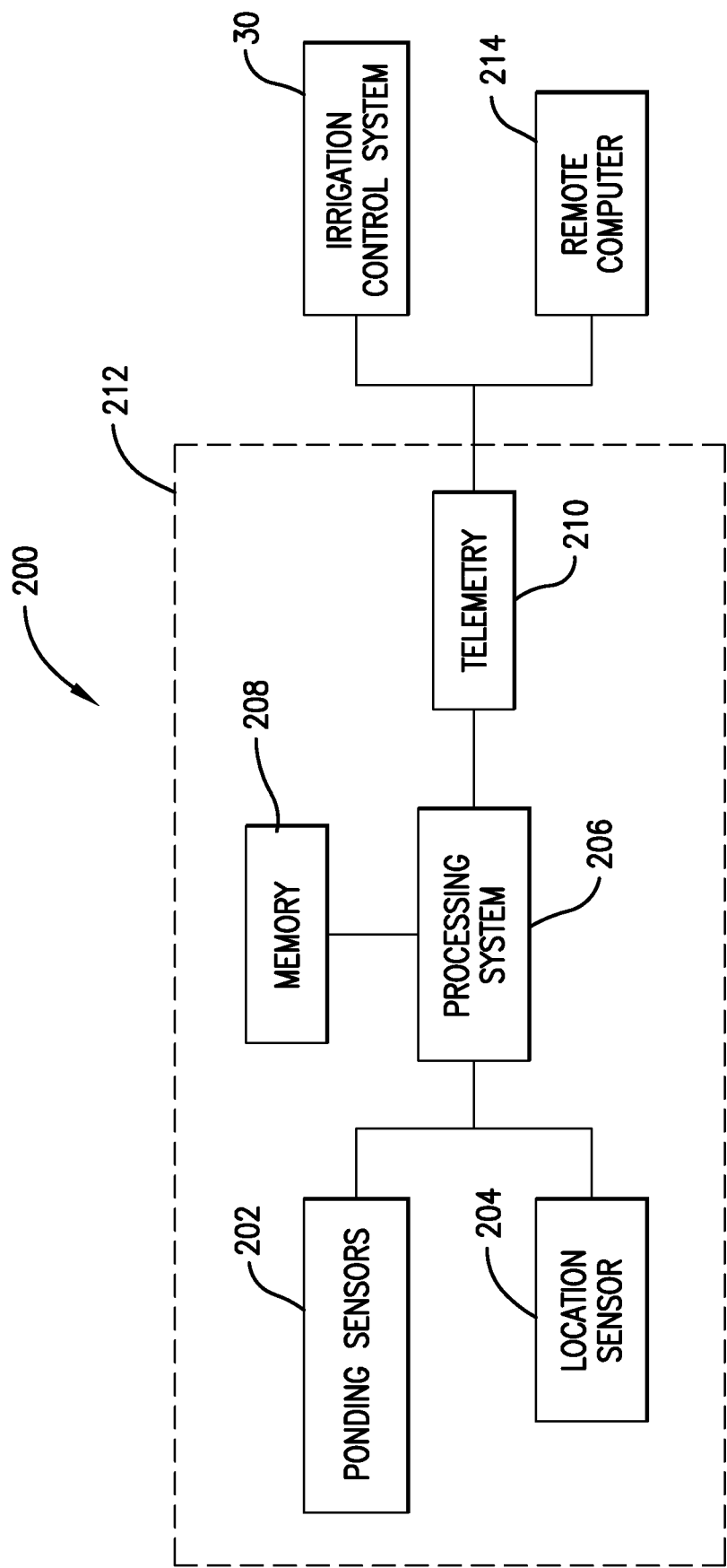
FIG. 2 is a block diagram depicting selected components of an embodiment of the wheel track monitoring system.

A ponding monitoring and detection system 200 constructed in accordance with embodiments of the invention is depicted in FIG. 2. The system 200 broadly comprises at least one ponding sensor 202; at least one location sensor 204; and a processing system 206 in communication with the ponding sensor 202 and location sensor 204. The system 200 may also comprise memory 208, a telemetry unit 210, and a dedicated power source for powering the sensors 202, 204 and/or the processing system 206.

The components of the ponding monitoring and detection system 200 may be housed in one or more enclosures 212 or may be integrated in the enclosures of other control systems or electronic devices on the irrigation system. The enclosures 212 may be positioned and attached anywhere on the irrigation system 10 and may be constructed from any suitable vibration- and impact-resistant materials such as, for example, plastic, nylon, aluminum, or any combination thereof and may include one or more appropriate gaskets or seals to make it substantially waterproof or water resistant. Although the electronic components of the system are preferably mounted together within the enclosures 212, they need not be since wireless communication among the various depicted components is possible and intended to fall within the scope of the present invention. Thus, components of the system may be located remotely from the enclosures 212 and from each other.

Each of the ponding sensors 202 senses conditions of the field representative of ponding and generates corresponding sensor data. The ponding sensors are preferably located on the mobile irrigation system, but they may also be located on anything that moves with the irrigation system. Importantly, the ponding sensors 202 are mounted below the fall height of crops so they are not blocked by crop canopy.

In some embodiments, the ponding sensors 202 are light detection and ranging (LIDAR) sensors, radio detection and ranging (RADAR) sensors, or other distance measuring sensors that sense distances between the sensors and the field or water accumulated on the field. This sensed distance can be used to detect standing water, because the distance between each sensor and standing water will be less than the distance between the sensor and a surface of the field not covered by water.

In other embodiments, the ponding sensors 202 are thermal image sensors or similar sensors that sense soil temperatures. The sensed soil temperatures can be used to detect standing water, because the water will likely have a temperature that is higher or lower than the soil temperature. For example, while the irrigation system and the carried ponding sensors travel over a field, the sensed temperature will likely change as the irrigation system traverses standing water and then change back again once the standing water has been traversed. The sensed temperature may also be representative of moist soil or dry soil in the same manner.

In still other embodiments, the ponding sensors 202 are cameras for capturing images of crops and/or the field in which the crops are planted. The images can be analyzed by the processing system 206 to detect standing water, moist soil, and or dry soil.

The ponding sensors 202 may also comprise one or more soil moisture sensors, rainfall sensors, irrigation rate sensors, and other sensors that detect the amount of water applied to the field either via the irrigation system or rainfall. In some embodiments, the ponding monitoring and detection system 200 may be equipped with several different types of ponding sensors 202 for gathering several different types of data representative of ponding.

The ponding sensors 202 may be mounted anywhere on the irrigation system 10 but are preferably suspended from the mobile towers. In some embodiments, one or more ponding sensors are provided for each mobile tower.

The location sensors 204 sense locations of the mobile irrigation system and generate corresponding location data as the irrigation system travels across a field and as the ponding sensors monitor the conditions described above. This permits the locations at which ponding is detected or predicted to be pinpointed.

The location sensors 204 may be mounted anywhere on the irrigation system but are preferably mounted to the mobile towers. In some embodiments, a location sensor is mounted to or near each mobile tower, and each of the ponding sensors is associated with one of the location sensors so that location data may be captured for all the ponding sensors as the irrigation system travels across a field.

In some embodiments, the location sensors 204 may be global navigation satellite system (GNSS) receivers such as GPS receivers, Glonass receivers, Galileo receivers, or compass system receivers operable to receive navigational signals from satellites to calculate positions of the mobile towers as a function of the signals. The GNSS receivers may include one or more processors, controllers, or other computing devices and memory for storing information accessed and/or generated by the processors or other computing devices and may include or be coupled with a patch antenna, helical antenna, or any other type of antenna. The location sensors 204 may calculate positions of the irrigation system and generate corresponding position signals to be sent to the processing system 206 and/or transmitted by the telemetry unit 210 or may simply relay satellite signals to the processing system or telemetry unit so that the processing system 206 or the remote computer 214 may calculate the positions of the irrigation system.

The location sensors 204 may also comprise other types of receiving devices capable of receiving location information from at least three transmitting locations and performing basic triangulation calculations to determine the relative position of the receiving device with respect to the transmitting locations. For example, cellular towers or any customized transmitting radio frequency towers can be used instead of satellites. With such a configuration, any standard geometric triangulation algorithm can be used to determine the exact location of the receiving unit.

In other embodiments, the location sensors 204 may include an angle encoder, cam switch, proximity switch, optical encoder, potentiometer, light bar sensor, or other mechanism for determining relative angular positions of one or more of the mobile towers with respect to the fixed center pivot 12.

The processing system 206 may comprise or include any number or combination of processors, controllers, ASICs, computers or other control circuitry and includes data inputs for receiving data from the sensors 202, 204 and outputs connected to the telemetry unit 210. The processing system may also comprise internal or external memory 208 for storing the sensor signals, the location signals, and/or other signals and data. The memory 208 may be any electronic memory that can be accessed by processing elements and operable for storing instructions or data. The memory may be integral with the processing system 206 or may be a stand-alone device. The memory 208 may be a single component or may be a combination of components that provide the requisite functionality. The memory may include various types of volatile or non-volatile memory such as flash memory, optical discs, magnetic storage devices, SRAM, DRAM, or other memory devices capable of storing data and instructions. The memory may communicate directly with the processing elements or may communicate over a bus or other mechanism that facilitates direct or indirect communication.

The telemetry unit 210 is coupled with the processing system 206 and is operable for transmitting data and signals to the remote computer 214 and/or the irrigation control system 30. The transmitted data and signals may include, for example, the sensor data, the location data, and the corrective action signals described above and below. The telemetry unit 42 may include one or more transceiver elements. The transceiver elements may include signal or data transmitting and receiving circuits, such as antennas, amplifiers, filters, mixers, oscillators, digital signal processors (DSPs), and the like. The transceiver elements may establish communication wirelessly by utilizing radio frequency (RF) signals and/or data that comply with communication standards such as cellular 2G, 3G, 4G or 5G, Institute of Electrical and Electronics Engineers (IEEE) 802.11 standard such as WiFi, IEEE 802.16 standard such as WiMAX, Bluetooth™, or combinations thereof. In addition, the transceiver elements may utilize communication standards such as ANT, ANT+, Bluetooth™ low energy (BLE), the industrial, scientific, and medical (ISM) band at 2.4 gigahertz (GHz), or the like.

The processing system 206 periodically or continuously receives and stores the sensor data and the location data as the irrigation system travels across a field and creates a log of the sensor data for multiple locations in the field. The processing system may also receive or otherwise access crop data representative of crop, soil, or water conditions in the field and store and analyze the crop data along with the sensor data. The crop data may include, for example, soil composition data (amount of sand, clay, etc.) and water infiltration rates for portions or zones of the irrigated field.

The processing system 206 may also store the date and time the sensor data and location data was obtained so the log indicates ponding conditions over time. The data may be stored in the memory 208 or other memory accessible by the processing system 206 and/or may be transmitted to a remote computer system 214 by the telemetry unit 210. The log or any data in the log may be accessed to determine if the conditions of the field indicate ponding or possible future ponding. The log, or portions of the data in the log, may be transmitted to remote computing devices and/or stored in remote servers and made available to any cloud computing device.

The processing system 206 also analyzes the sensor data and the crop data to detect or predict ponding on the field. To detect ponding, the processing system may compare the sensor data to threshold levels. For example, the processing system may compare the data from a LIDAR sensor, RADAR sensor, or other distance measuring sensor to threshold distance levels to determine if the distance between the ponding sensors and the field or water accumulated on the field is less than the threshold distances, thus indicating standing water on the field. The threshold distances levels may be selected by the operator and may vary from field to field and even for different locations within the same field but are generally related to the height the ponding sensor is mounted above the ground.

In other embodiments, the processing system 206 may detect ponding by comparing the sensor data to historical sensor data. For example, the processing system may compare the data from a LIDAR sensor, RADAR sensor, or other distance measuring sensor to historical distance levels to determine if the current distance between the ponding sensors and the field or water accumulated on the field is less than historical levels for the same geographic coordinates, thus indicating standing water on the field.

The processing system 206 may also approximate the area or other size of the ponding by considering which of the ponding sensors detect ponding, how far apart the ponding sensors are, how long the sensors detect the ponding as the irrigation system moves, and the speed of the irrigation system. The processing system may also analyze the sensor data to determine the approximate depth of ponding. For example, if a ponding sensor 202 is mounted 6 inches above the ground but detects a distance of 5" to the ground, the processing system can approximate the depth of ponding to be 1". This ponding size and depth data may be stored in memory and accessed later for detection and prediction purposes.

When ponding is detected, the processing system 206 stores data representative of the location of the ponding; the size of the ponding; the depth of the ponding; the date and time the ponding was detected; the date and time the ponding is no longer detected; the amount of irrigation applied to the relevant portions of the field for different time periods before the ponding was detected; and the amount of precipitation received by the relevant portions of the field for different time periods before the ponding was detected.

To predict possible future ponding, the processing system 206 may analyze sensor data acquired over time to determine rates of change of field conditions that may be indicative of future ponding. For example, the processing system may determine and analyze rates of change of data from soil moisture sensors, rainfall sensors, irrigation rate sensors, and other sensors that detect the amount of water applied to the field to detect when the applied water may begin to accumulate on the field. The processing system may also analyze the soil data, such as water infiltration rates for specific portions of the field, to help detect when the water may begin to accumulate on the field.

Ponding may also be predicted by comparing the data for actual detected ponding to current sensed data. For example, via machine learning, the processing system 206 may accurately predict future ponding by comparing current precipitation and irrigation rates to historical precipitation and irrigation rates that caused ponding in the past.

When ponding or likely future ponding is detected, the processing system 206 generates a corrective action signal and transmits it to the remote computer 214, smart phone, or control station so a farmer or other operator may take corrective action. The farmer or other operator may, for example, stop the irrigation system, alter the amount of water delivered by the irrigation system, and/or alter the speed of the irrigation system.

Each corrective action signal identifies whether ponding has already occurred or is just predicted and the location or locations of the ponding or expected ponding in the field. The corrective action signals are preferably transmitted upon creation but may also be batched and sent periodically such as every hour or day.

In other embodiments, the processing system 206 transmits the corrective action signals to the irrigation control system 30 that controls operation of the irrigation system. The corrective action signals may include instructions for operating the irrigation system to accommodate problems with any of the irrigation system components. Or, such instructions may be developed by the irrigation control system 30 based on data sent by the processing system. Such instructions may include, for example, stopping movement of the irrigation system, altering the amount of water delivered by the irrigation system, and/or altering the speed of the irrigation system.

Figure 3:
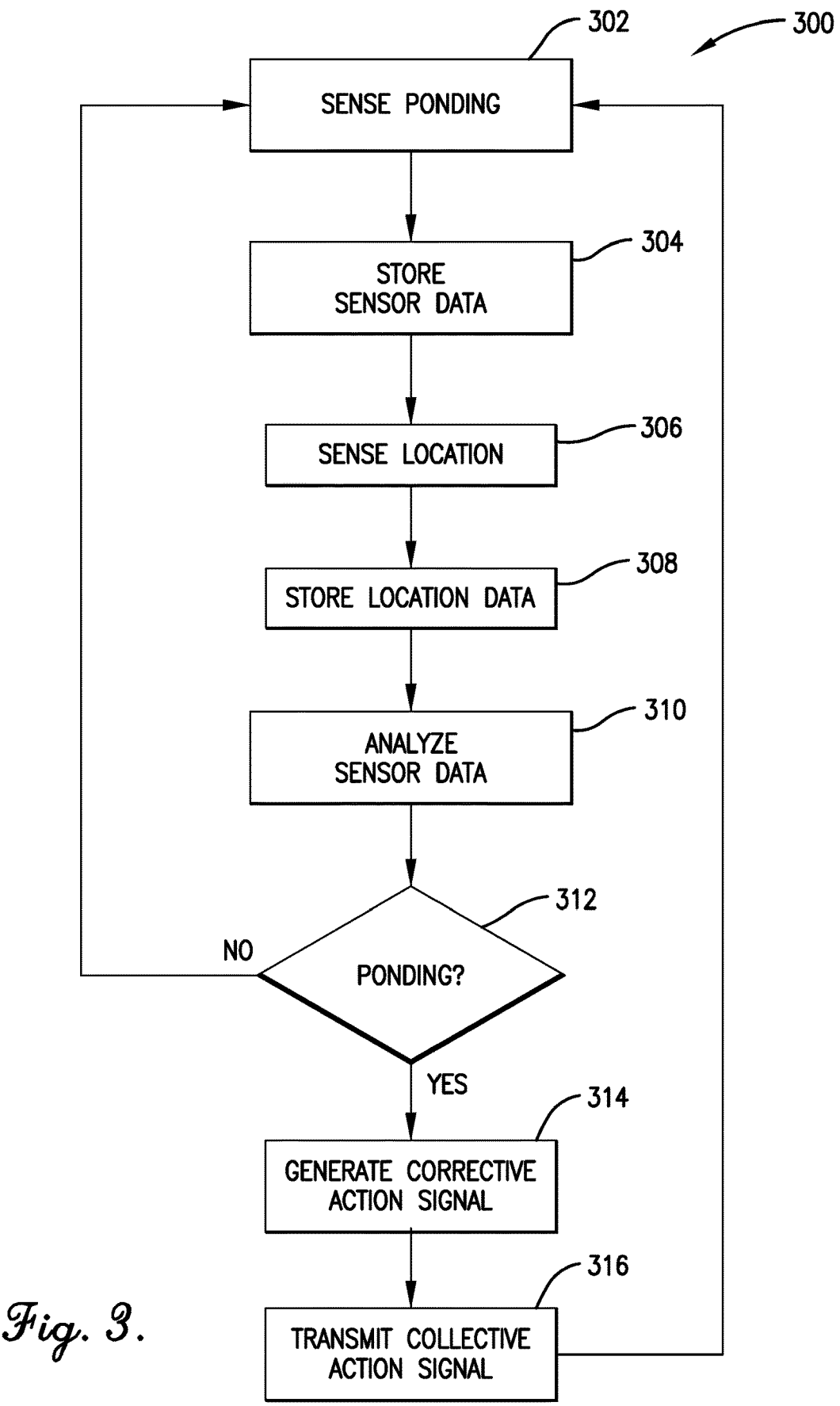
FIG. 3 is a flow diagram depicting exemplary steps in a method of the present invention or portions of a computer program of an embodiment of the present invention.

Operation of the above-described monitoring system 200 will now be described with reference to FIG. 3. The flow chart of FIG. 3 shows the functionality and operation of an exemplary method 300 of the present technology. Some of the blocks of the flow chart may represent a step in the method 300 and/or a module section or portion of code of computer programs that operate the processing system 206. In some alternative implementations, the functions noted in the various blocks may occur out of the order depicted in FIG. 3. For example, two blocks shown in succession in FIG. 3 may in fact be executed substantially concurrently, or the block may sometimes be executed in the reverse order depending upon the functionality involved.

The method 300 begins in step 302 where the ponding sensors 202 sense conditions of the field representative of ponding and generate corresponding sensor data. This step may be performed continuously or periodically.

In step 304, the sensor data is stored in the memory 208 or other memory and/or transmitted and stored in the remote computer system 214.

In step 306, the location sensors 204 sense at least one location of the agricultural irrigation system 10 and generate corresponding location data. This step may be performed continuously or periodically.

In step 308, the location data is stored in the memory 208 and/or transmitted and stored in the remote computer system 214. Steps 304 and 306 preferably store the sensor data and the location data for a plurality of locations of the agricultural irrigation system as it moves across an irrigated field.

In steps 310 and 312, the processing system 206 analyzes the sensor data to detect or predict ponding at locations of the agricultural irrigation system as it moves across an irrigated field.

In step 314, the processing system 206 generates a corrective action signal if ponding is detected or predicted in step 312. The corrective action signal indicates the locations at which the ponding is detected or predicted and includes information about the ponding for each of the detected locations. The information may be any of the data and information discussed above.

In step 316, the corrective action signal is transmitted to the remote computer 214, smart phone, or control station so a farmer or other operator may take corrective action. Alternatively, the corrective action signal may be transmitted to the irrigation control system 30 so the control system may control operational aspects of the irrigation system so as to alleviate the effects of the detected or predicted ponding.

Additional Considerations

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims. For example, the principles of the present invention are not limited to the illustrated center pivot irrigation systems but may be implemented in any type of irrigation system including linear move irrigation systems.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Some of the functions described herein may be implemented with one or more computer programs executed by the processing system 206. Each computer program comprises an ordered listing of executable instructions for implementing logical functions and can be embodied in any computer-readable medium for use by or in connection with an instruction execution system, apparatus, or device that can fetch the instructions and execute the instructions. In the context of this application, a "computer-readable medium" can be any means that can contain, store, communicate, propagate or transport the program for use by or in connection with the instruction execution system, apparatus, or device including, but not limited to, the memory 208. The computer-readable medium can be, for example, but not limited to, an electronic, magnetic, optical, electro-magnetic, infrared, or semi-conductor system, apparatus, device, or propagation medium. More specific, although not inclusive, examples of the computer-readable medium would include the following: an electrical connection having one or more wires, a random access memory (RAM), a read-only memory (ROM), an erasable, programmable, read-only memory (EPROM or Flash memory), an optical fiber, and a portable compact disk read-only memory (CDROM).

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, processing elements such as the processing system 206 may be implemented as special purpose computers or as general purpose computers. For example, the electronic circuits may comprise dedicated circuitry or logic that is permanently configured, such as an application-specific integrated circuit (ASIC), or indefinitely configured, such as an FPGA, to perform certain operations. The electronic circuits may also comprise programmable logic or circuitry (e.g., as encompassed within a general-purpose processor or other programmable processor) that is temporarily configured by software to perform certain operations. It will be appreciated that the decision to implement the electronic circuits as special purpose, in dedicated and permanently configured circuitry, or as general purpose (e.g., configured by software) may be driven by cost and time considerations.

Accordingly, the terms "processing system," "electronic circuits," "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the electronic circuits are temporarily configured (e.g., programmed), each of the processing elements need not be configured or instantiated at any one instance in time. For example, where the electronic circuits comprise a general-purpose processor configured using software, the general-purpose processor may be configured as respective different processing elements at different times. Software may accordingly configure the electronic circuits to constitute a hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, later, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of the method 300 may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Having thus described the preferred embodiment of the invention, what is claimed as new and desired to be protected by Letters Patent includes the following:

1. A mobile irrigation system for irrigating a field, the mobile irrigation system comprising:
 a plurality of spaced-apart and interconnected mobile towers;

a fluid distribution conduit supported by the mobile towers and connected to a source of fluids;

a plurality of fluid emitters connected to the fluid distribution conduit for applying fluids to the field as the mobile towers move over the field;

a control system for controlling a speed and direction of the mobile towers and application of the fluids by the fluid emitters; and a ponding monitoring and detection system comprising:
  a distance measuring sensor located on the mobile irrigation system and configured to:
    sense a distance between the distance measuring sensor and a target being at least one of the field and water accumulated on the field, and
    generate distance data corresponding to the distance; and
  a processing system in communication with the distance measuring sensor and operable to—
    receive the distance data from the distance measuring sensor;
    compare the distance data to a threshold distance level such that standing water on the field is detected if the distance is less than a threshold distance represented by the threshold distance level;
    generate a corrective action signal if standing water on the field is detected; and
    transmit the corrective action signal to the control system or to a remote computing device.

2. The mobile irrigation system as set forth in claim 1, wherein the processing system is located remotely from the mobile irrigation system.

3. The mobile irrigation system set forth in claim 1, wherein the distance measuring sensor is selected from the group consisting of a light detection and ranging (LIDAR) sensor and a radio detection and ranging (RADAR) sensor.

4. The mobile irrigation system as set forth in claim 1, wherein the ponding monitoring and detection system further comprises a location sensor for sensing locations of the mobile irrigation system and for generating corresponding location data as the distance measuring sensor senses the distance.

5. The mobile irrigation system as set forth in claim 4, wherein the processing system is further operable to store the distance data and the location data for a plurality of locations of the mobile irrigation system as the mobile irrigation system moves.

6. The mobile irrigation system as set forth in claim 5, wherein the corrective action signal indicates the locations in the field at which the ponding monitoring and detection system detects standing water on the field.

7. The mobile irrigation system as set forth in claim 4, wherein the processing system is further operable to approximate an area of standing water on the field based on the distance data from the distance measuring sensor and the location data from the location sensor.

8. The mobile irrigation system as set forth in claim 1, further comprising a telemetry unit for transmitting the corrective action signal to a computer device remote from the mobile irrigation system and the processing system.

9. The mobile irrigation system as set forth in claim 1, wherein the threshold distance level corresponds to historical distance data.

10. The mobile irrigation system as set forth in claim 1, wherein the corrective action signal includes instructions for operating the mobile irrigation system, and wherein the processing system is further operable to transmit the corrective action signal to the control system.

11. The mobile irrigation system as set forth in claim 10, wherein the instructions for operating the mobile irrigation system are instructions selected from the group consisting of stopping movement of the mobile irrigation system, changing a speed of the mobile irrigation system, reducing water discharge from the mobile irrigation system, and stopping water discharge from the mobile irrigation system.

12. The mobile irrigation system as set forth in claim 1, wherein the threshold distance level is selected by an operator.

13. The mobile irrigation system as set forth in claim 1, wherein the threshold distance level varies for different locations within the field.

14. A mobile irrigation system comprising:
  a plurality of spaced-apart and interconnected mobile towers;
  a fluid distribution conduit supported by the mobile towers and connected to a source of fluids;
  a plurality of fluid emitters connected to the fluid distribution conduit for applying fluids to a field underneath the agricultural irrigation system;
  a control system for controlling at least some of the electrical and/or mechanical components to control a speed and direction of the mobile towers and application of the fluids by the fluid emitters; and
  a ponding monitoring and detection system comprising:
    a distance measuring sensor located on the mobile irrigation system and configured to:
      sense a distance between the distance measuring sensor and a target being at least one of the field and water accumulated on the field, and
      generate distance data corresponding to the distance;
    a location sensor for sensing locations of the mobile irrigation system and for generating corresponding location data as the distance measuring sensor senses the distance; and
    a processing system located remotely from the mobile irrigation system and operable to—
      receive the distance data from the distance measuring sensor;
      receive the location data from the location sensor;
      compare the distance data to a threshold distance level such that standing water on the field is detected if the distance is less than a threshold distance represented by the threshold distance level;
      store the distance data and the location data for a plurality of locations of the mobile irrigation system as the mobile irrigation system moves;
      generate a corrective action signal if standing water on the field is detected; and
      transmit the corrective action signal to the control system or to a remote computing device.

15. The mobile irrigation system set forth in claim 14, wherein the distance measuring sensor is selected from the group consisting of a light detection and ranging (LIDAR) sensor and a radio detection and ranging (RADAR) sensor.

16. The mobile irrigation system as set forth in claim 14, wherein the corrective action signal indicates the locations in the field at which the ponding monitoring and detection system detects standing water on the field.

17. The mobile irrigation system as set forth in claim 14, further comprising a telemetry unit for transmitting the corrective action signal to a computer device remote from the mobile irrigation system and the processing system.

18. The mobile irrigation system as set forth in claim 14, wherein the threshold distance level corresponds to historical distance data.

19. The mobile irrigation system as set forth in claim 14, wherein the processing system is further operable to approximate an area of standing water on the field based on the distance data from the distance measuring sensor and the location data from the location sensor.

20. The mobile irrigation system as set forth in claim 14, wherein the threshold distance level is selected by an operator.

21. The mobile irrigation system as set forth in claim 14, wherein the threshold distance level varies for different locations within the field.

22. A mobile irrigation system comprising:
- a plurality of spaced-apart and interconnected mobile towers;
- a fluid distribution conduit supported by the mobile towers and connected to a source of fluids;
- a plurality of fluid emitters connected to the fluid distribution conduit for applying fluids to a field underneath the agricultural irrigation system;
- a control system for controlling at least some of the electrical and/or mechanical components to control a speed and direction of the mobile towers and application of the fluids by the fluid emitters; and
- a ponding monitoring and detection system comprising:
  - a distance measuring sensor located on the mobile irrigation system, the distance measuring sensor being selected from the group consisting of a light detection and ranging (LIDAR) sensor and a radio detection and ranging (RADAR) sensor, the distance measuring sensor being configured to:
    - sense a distance between the distance measuring sensor and a target being at least one of the field and water accumulated on the field, and
    - generate distance data corresponding to the distance;
  - a location sensor for sensing locations of the mobile irrigation system and for generating corresponding location data as the distance measuring sensor senses the distance; and
  - a processing system located remotely from the mobile irrigation system and operable to—
    - receive the distance data from the distance measuring sensor;
    - receive the location data from the location sensor;
    - compare the distance data to a threshold distance level such that standing water on the field is detected if the distance is less than a threshold distance represented by the threshold distance level, the threshold distance level having a value dependent on the location data;
    - store the distance data and the location data for a plurality of locations of the mobile irrigation system as the mobile irrigation system moves;
    - generate a corrective action signal if standing water on the field is detected;
    - transmit the corrective action signal to the control system or to a remote computing device;
    - approximate an area of standing water on the field based on the distance data from the distance measuring sensor and the location data from the location sensor; and
    - determine a depth of the standing water on the field based on the distance data from the distance measuring sensor.

\* \* \* \* \*